United States Patent
Marzban et al.

(10) Patent No.: US 12,231,356 B2
(45) Date of Patent: Feb. 18, 2025

(54) UPLINK FREQUENCY HOPPING AND SCHEDULING

(71) Applicant: QUALCOMM Incorporated, San Diego, CA (US)

(72) Inventors: Mohamed Fouad Ahmed Marzban, San Diego, CA (US); Ahmed Abdelaziz Ibrahim Abdelaziz Zewail, San Diego, CA (US); Wooseok Nam, San Diego, CA (US); Tao Luo, San Diego, CA (US); Xiaoxia Zhang, San Diego, CA (US); Jing Sun, San Diego, CA (US); Zhifei Fan, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/444,101

(22) Filed: Jul. 30, 2021

(65) Prior Publication Data

US 2023/0034334 A1  Feb. 2, 2023

(51) Int. Cl.
*H04L 5/00* (2006.01)
*H04L 27/26* (2006.01)
(Continued)

(52) U.S. Cl.
CPC .......... *H04L 5/0012* (2013.01); *H04L 5/0051* (2013.01); *H04L 27/26025* (2021.01); *H04W 72/0453* (2013.01); *H04W 72/23* (2023.01)

(58) Field of Classification Search
None
See application file for complete search history.

(56) References Cited

U.S. PATENT DOCUMENTS 5,533,030 A * 7/1996 Schiffel ................ H04W 84/14
370/481
11,202,183 B2 * 12/2021 Rico Alvarino ...... H04L 1/0068
(Continued)

FOREIGN PATENT DOCUMENTS

CN  113243134 A  *  8/2021  ............. H04B 1/713
CN  115088348 A  *  9/2022  ........... H04L 5/0012
(Continued)

OTHER PUBLICATIONS

International Search Report and Written Opinion—PCT/US2022/072651—ISA/EPO—Oct. 10, 2022.

*Primary Examiner* — Andrew C Oh
(74) *Attorney, Agent, or Firm* — Harrity & Harrity, LLP

(57) ABSTRACT

Various aspects of the present disclosure generally relate to wireless communication. In some aspects, a user equipment (UE) may determine an amount of time between uplink allocations that is needed for performing frequency retuning during operation at a subcarrier spacing (SCS). The UE may perform frequency retuning in association with hopping from a first set of frequency resources, associated with transmitting a first uplink transmission, to a second set of frequency resources, associated with transmitting a second uplink transmission, during operation at the SCS, wherein the frequency retuning is performed during a set of consecutive unallocated resources determined based at least in part on the amount of time between uplink allocations that is needed for performing frequency retuning. Numerous other aspects are described.

30 Claims, 9 Drawing Sheets

(51) Int. Cl.
*H04W 72/0453* (2023.01)
*H04W 72/23* (2023.01)

(56) References Cited

U.S. PATENT DOCUMENTS

| | | | | |
|---|---|---|---|---|
| 2015/0016428 | A1* | 1/2015 | Narasimha | H04W 56/0045 370/336 |
| 2016/0381490 | A1* | 12/2016 | Rico Alvarino | H04W 4/70 370/330 |
| 2017/0034850 | A1* | 2/2017 | Rico Alvarino | H04W 72/23 |
| 2017/0094547 | A1* | 3/2017 | Yum | H04L 5/00 |
| 2018/0184323 | A1* | 6/2018 | Xiong | H04W 84/045 |
| 2018/0227156 | A1* | 8/2018 | Papasakellariou | H04W 72/0453 |
| 2019/0044678 | A1* | 2/2019 | Liu | H04L 5/001 |
| 2019/0229859 | A1* | 7/2019 | Manolakos | H04W 56/00 |
| 2019/0230696 | A1* | 7/2019 | Kim | H04W 74/0833 |
| 2019/0373602 | A1* | 12/2019 | Qin | H04B 7/0404 |
| 2019/0380134 | A1* | 12/2019 | Liu | H04W 72/0453 |
| 2021/0160911 | A1* | 5/2021 | Park | H04L 5/0094 |
| 2021/0400563 | A1* | 12/2021 | Amend | H04W 48/06 |
| 2022/0039115 | A1* | 2/2022 | Sun | H04W 72/1263 |
| 2022/0322345 | A1* | 10/2022 | Kwak | H04W 72/0453 |
| 2022/0346094 | A1* | 10/2022 | Yan | H04L 5/0082 |

FOREIGN PATENT DOCUMENTS

| | | | | |
|---|---|---|---|---|
| CN | 115804178 | A * | 3/2023 | H04L 27/26025 |
| EP | 3641393 | A2 * | 4/2020 | H04L 5/001 |
| EP | 3661294 | B1 * | 8/2022 | H04L 5/00 |
| JP | 2017516400 | A * | 6/2017 | H04W 72/20 |
| WO | WO-2012022370 | A2 * | 2/2012 | H04W 72/1205 |
| WO | WO-2016004634 | A1 * | 1/2016 | H04L 27/26025 |
| WO | WO-2018025893 | A2 * | 2/2018 | H04L 5/0053 |
| WO | WO-2019032833 | A1 * | 2/2019 | H04B 1/713 |
| WO | WO-2019165224 | A1 * | 8/2019 | H04B 7/0626 |
| WO | WO-2020060875 | A1 * | 3/2020 | H04B 1/713 |
| WO | WO-2021146887 | A1 | 7/2021 | |
| WO | WO-2021199346 | A1 * | 10/2021 | H04W 24/10 |

* cited by examiner

UPLINK FREQUENCY HOPPING AND SCHEDULING

FIELD OF THE DISCLOSURE

Aspects of the present disclosure generally relate to wireless communication and to techniques and apparatuses for uplink frequency hopping and scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining an amount of time between uplink allocations that is needed for performing frequency retuning during operation at a subcarrier spacing (SCS). The method may include performing frequency retuning in association with hopping from a first set of frequency resources, associated with transmitting a first uplink transmission, to a second set of frequency resources, associated with transmitting a second uplink transmission, during operation at the SCS, where the frequency retuning is performed during a set of consecutive unallocated resources determined based at least in part on the amount of time between uplink allocations that is needed for performing frequency retuning.

Some aspects described herein relate to a method of wireless communication performed by a base station. The method may include determining an amount of time between uplink allocations that is needed by a UE for performing frequency retuning during operation of the UE at an SCS. The method may include receiving a first uplink transmission in a first set of frequency resources and a second uplink transmission in a second set of frequency resources, where the first uplink transmission and the second uplink transmission are received based at least in part on the amount of time between uplink allocations that is needed by the UE for performing frequency retuning during operation of the UE at the SCS.

Some aspects described herein relate to a UE for wireless communication. The user equipment may include a memory and one or more processors coupled to the memory. The one or more processors may be configured to determine an amount of time between uplink allocations that is needed for performing frequency retuning during operation at an SCS. The one or more processors may be configured to perform frequency retuning in association with hopping from a first set of frequency resources, associated with transmitting a first uplink transmission, to a second set of frequency resources, associated with transmitting a second uplink transmission, during operation at the SCS.

Some aspects described herein relate to a base station for wireless communication. The base station may include a memory and one or more processors coupled to the memory. The one or more processors may be configured to determine an amount of time between uplink allocations that is needed by a UE for performing frequency retuning during operation of the UE at an SCS. The one or more processors may be configured to receive a first uplink transmission in a first set of frequency resources and a second uplink transmission in a second set of frequency resources.

Some aspects described herein relate to a non-transitory computer-readable medium that stores a set of instructions for wireless communication by a UE. The set of instructions, when executed by one or more processors of the UE, may cause the UE to determine an amount of time between uplink allocations that is needed for performing frequency retuning during operation at an SCS. The set of instructions, when executed by one or more processors of the UE, may cause the UE to perform frequency retuning in association with hopping from a first set of frequency resources, associated with transmitting a first uplink transmission, to a second set of frequency resources, associated with transmitting a second uplink transmission, during operation at the SCS.

Some aspects described herein relate to a non-transitory computer-readable medium that stores a set of instructions for wireless communication by a base station. The set of instructions, when executed by one or more processors of the base station, may cause the base station to determine an amount of time between uplink allocations that is needed by a UE for performing frequency retuning during operation of the UE at an SCS. The set of instructions, when executed by one or more processors of the base station, may cause the base station to receive a first uplink transmission in a first set of frequency resources and a second uplink transmission in a second set of frequency resources.

Some aspects described herein relate to an apparatus for wireless communication. The apparatus may include means for determining an amount of time between uplink allocations that is needed for performing frequency retuning during operation at an SCS. The apparatus may include means for performing frequency retuning in association with hopping from a first set of frequency resources, associated with transmitting a first uplink transmission, to a second set of frequency resources, associated with transmitting a second uplink transmission, during operation at the SCS, where the frequency retuning is performed during a set of consecutive unallocated resources determined based at least in part on the amount of time between uplink allocations that is needed for performing frequency retuning.

Some aspects described herein relate to an apparatus for wireless communication. The apparatus may include means for determining an amount of time between uplink allocations that is needed by a UE for performing frequency retuning during operation of the UE at an SCS. The apparatus may include means for receiving a first uplink transmission in a first set of frequency resources and a second uplink transmission in a second set of frequency resources, where the first uplink transmission and the second uplink transmission are received based at least in part on the amount of time between uplink allocations that is needed by the UE for performing frequency retuning during operation of the UE at the SCS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
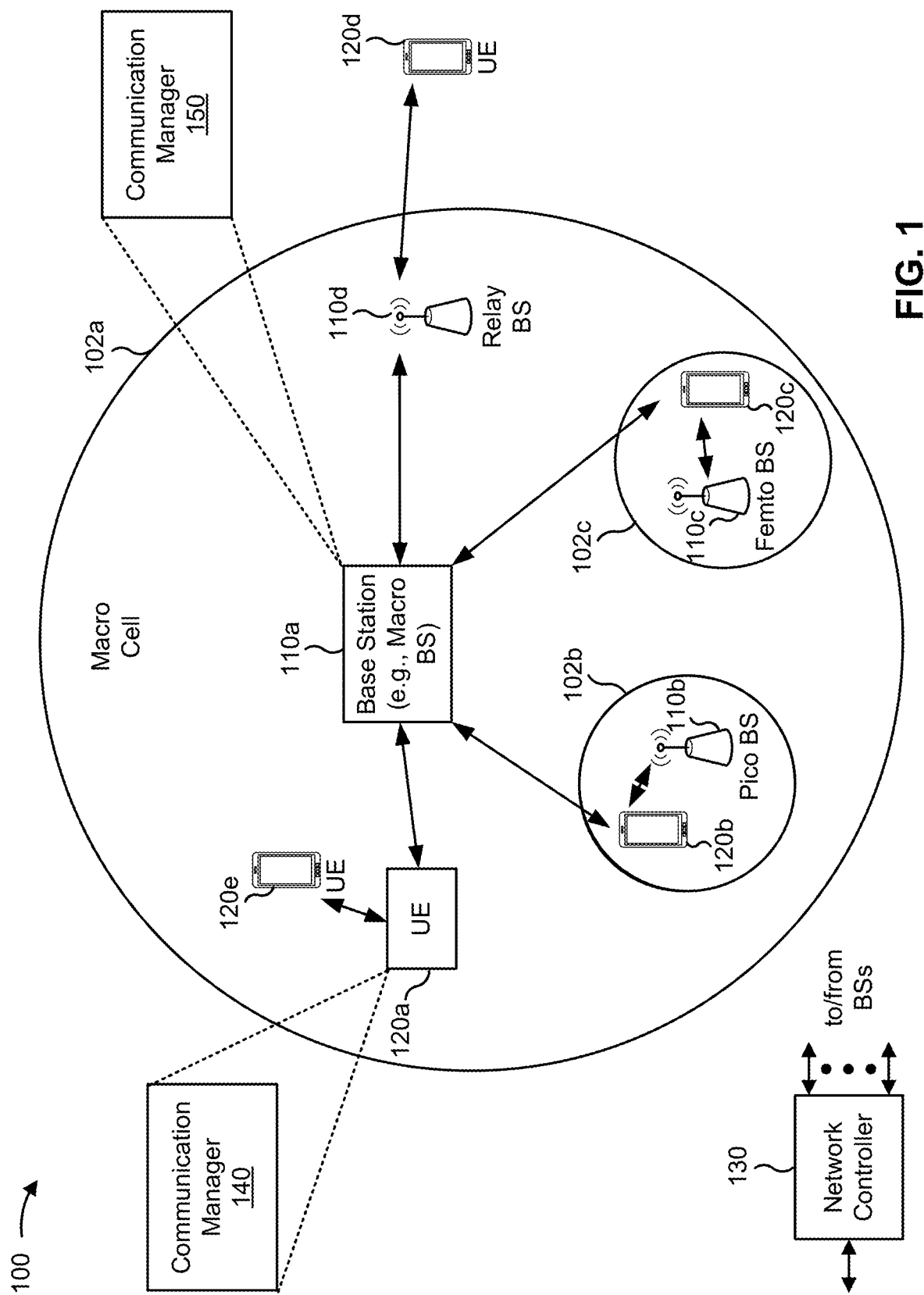
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine an amount of time between uplink allocations that is needed for performing frequency retuning during operation at an SCS; and perform frequency retuning in association with hopping from a first set of frequency resources, associated with transmitting a first uplink transmission, to a second set of frequency resources, associated with transmitting a second uplink transmission, during operation at the SCS, wherein the frequency retuning is performed during a set of consecutive unallocated resources determined based at least in part on the amount of time between uplink allocations that is needed for performing frequency retuning. Additionally, or alternatively, the communication manager 140 may perform one or more other operations described herein.

In some aspects, the base station 110 may include a communication manager 150. As described in more detail elsewhere herein, the communication manager 150 may determine an amount of time between uplink allocations that is needed by a UE 120 for performing frequency retuning during operation of the UE 120 at an SCS; and receive a first uplink transmission in a first set of frequency resources and a second uplink transmission in a second set of frequency resources, wherein the first uplink transmission and the second uplink transmission are received based at least in part on the amount of time between uplink allocations that is needed by the UE 120 for performing frequency retuning during operation of the UE 120 at the SCS. Additionally, or alternatively, the communication manager 150 may perform one or more other operations described herein.

As indicated above, FIG. 1 is provided as an example. Other examples may differ from what is described with regard to FIG. 1.

Figure 2:
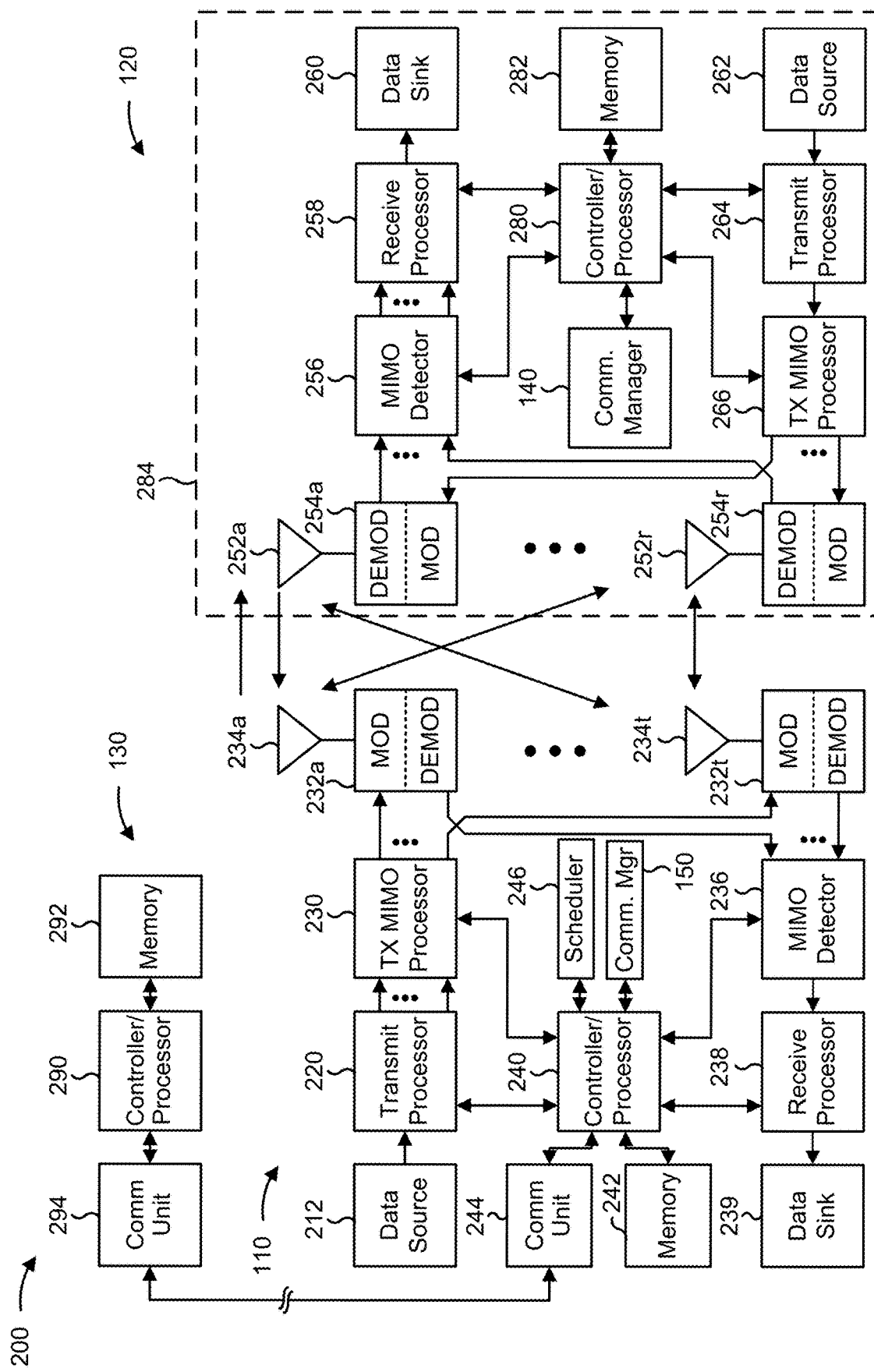
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-7).

The controller/processor 240 of the base station 110, the controller/processor 280 of the UE 120, and/or any other component(s) of FIG. 2 may perform one or more techniques associated with uplink frequency hopping and scheduling, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, the UE 120 includes means for determining an amount of time between uplink allocations that is needed for performing frequency retuning during operation at an SCS; and/or means for performing frequency retuning in association with hopping from a first set of frequency resources, associated with transmitting a first uplink transmission, to a second set of frequency resources, associated with transmitting a second uplink transmission, during operation at the SCS, wherein the frequency retuning is performed during a set of consecutive unallocated resources determined based at least in part on the amount of time between uplink allocations that is needed for performing frequency retuning. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for determining an amount of time between uplink allocations that is needed by a UE 120 for performing frequency retuning during operation of the UE 120 at an SCS; and/or means for receiving a first uplink transmission in a first set of frequency resources and a second uplink transmission in a second set of frequency resources, wherein the first uplink transmission and the second uplink transmission are received based at least in part on the amount of time between uplink allocations that is needed by the UE 120 for performing frequency retuning during operation of the UE 120 at the SCS. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Uplink frequency hopping enables a UE to "hop" among different frequencies in association with transmitting uplink communications. For example, a UE with frequency hopping enabled may have an RF module tuned to a first frequency and transmit a first uplink transmission in a first set of frequency resources. The UE may tune the RF module to a second frequency and transmit a second uplink transmission in a second set of frequency resources. In general, frequency hopping provides diversity gain that enhances block error rate (BLER) performance of the wireless communication system. However, in some scenarios, an amount of time needed to tune the RF module (herein referred to as a frequency tuning delay) can impact reliability of wireless communications.

For example, a wireless communication system may support use of multiple physical uplink shared channel (multi-PUSCH) scheduling. In general, multi-PUSCH scheduling enables a single grant (e.g., carried in downlink control information (DCI)) to schedule up to eight PUSCH transmissions. Notably, multi-PUSCH scheduling may be used for wireless communication at a variety of SCSs, including higher SCSs such as 120 kilohertz (kHz), 480 kHz, and 960 kHz (e.g., for a 60 gigahertz (GHz) frequency band). One advantage of multi-PUSCH scheduling is a reduction in control signaling overhead. To support multi-PUSCH scheduling, each row of a time domain resource allocation (TDRA) table indicates up to eight PUSCH allocations, and the PUSCH allocations can be continuous or non-continuous in the time-domain. Here, each PUSCH allocation has a separate start and length indicator value (SLIV) and mapping type, and the number of scheduled PUSCH allocations is implicitly indicated by the number of indicated valid SLIVs in the row of the TDRA table. In some systems, frequency hopping can be used in conjunction with multi-PUSCH scheduling (e.g., such that a UE can hop among different frequencies for different PUSCH transmissions scheduled in a multi-PUSCH scheduling grant). However, as indicated above, when performing frequency hopping, the UE needs some amount of time to tune the RF module and switch frequencies, with the amount of time depending on the UE implementation. Further, symbol times are shorter at higher SCSs (e.g., 120 kHz or higher) than at lower SCSs and, therefore, there is less resilience against the frequency tuning delay. As a particular example, for a UE operating at an SCS of 960 kHz, a symbol time is 1.04 microseconds (s). Here, if the frequency tuning delay of the UE is 5 μs, then the UE may lose five symbols during the frequency tuning process when transmitting according to the multi-PUSCH scheduling grant, which may lead to decoding failure at the base station.

As another example, a wireless communication system may support PUSCH repetitions. A PUSCH repetition may be used to improve reliability (e.g., for ultra-reliable low latency communication (URLLC) communications). When PUSCH repetitions are used, a ULE repeats transmission of a communication multiple times. For example, the UE may transmit an initial uplink transmission and may repeat transmission of (e.g., may retransmit) that uplink transmission one or more times. As used herein, the term "repetition" is used to refer to the initial transmission and is also used to refer to a repeated transmission of the initial transmission. One type of PUSCH repetition is referred to as PUSCH repetition type A. For PUSCH repetition type A, uplink transmission occasions are not permitted to cross a slot boundary, and only one uplink transmission occasion is permitted per slot. Another type of PUSCH repetition is referred to as PUSCH repetition type B. For PUSCH repetition type B, uplink transmission occasions are permitted to cross a slot boundary, and more than one uplink transmission occasion is permitted per slot. Notably, in some systems, frequency hopping can be used in conjunction with PUSCH repetition (e.g., such that a UE can hop among different frequencies for different PUSCH repetitions). With respect to PUSCH repetition type A, intra-slot frequency hopping is enabled, with a number of symbols to be transmitted in a first set of frequency resources (i.e., a number of symbols in the first hop) being given by $\lfloor N_{symb}^{PUSCHs}/2 \rfloor$, and a number of symbols to be transmitted in a second set of frequency resources (i.e., number of symbols in the second hop) is given by $N_{symb}^{PUSCHs} - \lfloor N_{symb}^{PUSCHs}/2 \rfloor$, where $N_{symb}^{PUSCHs}$ is the length of the PUSCH transmission in OFDM symbols in one slot. With respect to PUSCH repetition type B, a frequency hopping mode can be either inter-repetition frequency hopping or inter-slot frequency hopping, with the frequency hopping mode following a configuration of an activating DCI format. However, as indicated above, when performing frequency hopping, the UE needs some amount of time to tune the RF module to hop frequencies, with the amount of time depending on the UE implementation. Thus, similar to the case of frequency hopping with multi-PUSCH, the frequency tuning delay of the UE may cause a UE (e.g., a UE operating at a higher SCS) to lose symbols during the frequency tuning process when transmitting according to the configured PUSCH repetition, which may lead to decoding failure at the base station. Furthermore, frequency hopping for PUSCH repetitions is not configured to take advantage of available TDRA gaps (e.g., one or more symbols between symbols allocated to the UE for the PUSCH repetitions) and, therefore, may be inefficient in terms of timing of frequency hopping to reduce or minimize lost symbols.

As another example, in some scenarios, a base station may schedule a UE for back-to-back uplink transmissions on different sets of frequency resources. Here, a time mask may define a transient period between uplink transmission symbols (e.g., a period between a sounding reference signal (SRS) symbol and an adjacent PUSCH or physical uplink control channel (PUCCH) symbol). In general, the time mask is applied for all types of frame structures and their allowed PUCCH/PUSCH/SRS transmissions. The time mask may have duration of, for example, 5 s. In the case of frequency hopping, a transient period corresponding to the time mask is typically split (e.g., shared symmetrically) between last resources (e.g., a last symbol) before the frequency hop and first resources (e.g., a first symbol) after the frequency hop. However, as indicated above, when performing frequency hopping, the UE needs some amount of time to tune the RF module and hop frequencies, with the amount of time depending on the UE implementation. Thus, similar to the cases of frequency hopping with multi-PUSCH and frequency hopping with PUSCH repetition, the frequency tuning delay of the UE may cause a UE (e.g., a UE operating at a higher SCS) to lose symbols during the frequency tuning process when transmitting back-to-back uplink transmissions, which may lead to decoding failure at the base station.

Some techniques and apparatuses described herein enable improved uplink frequency hopping and scheduling. In some aspects, the improved frequency hopping and scheduling is performed based at least in part on an SCS or an amount of time needed by a UE to perform frequency retuning during operation at the SCS. In some aspects, the frequency hopping and scheduling techniques described herein reduce a likelihood of symbols being lost in association with uplink frequency hopping (e.g., for a UE operating at a higher SCS, such as 120 kHz or above). For example, the frequency tuning delay of the UE may be compensated for using the uplink frequency hopping and scheduling techniques described herein, meaning that resilience against the frequency tuning delay is improved, thereby reducing a likelihood of decoding failure at a base station. Additional details are provided below.

Figure 3A:
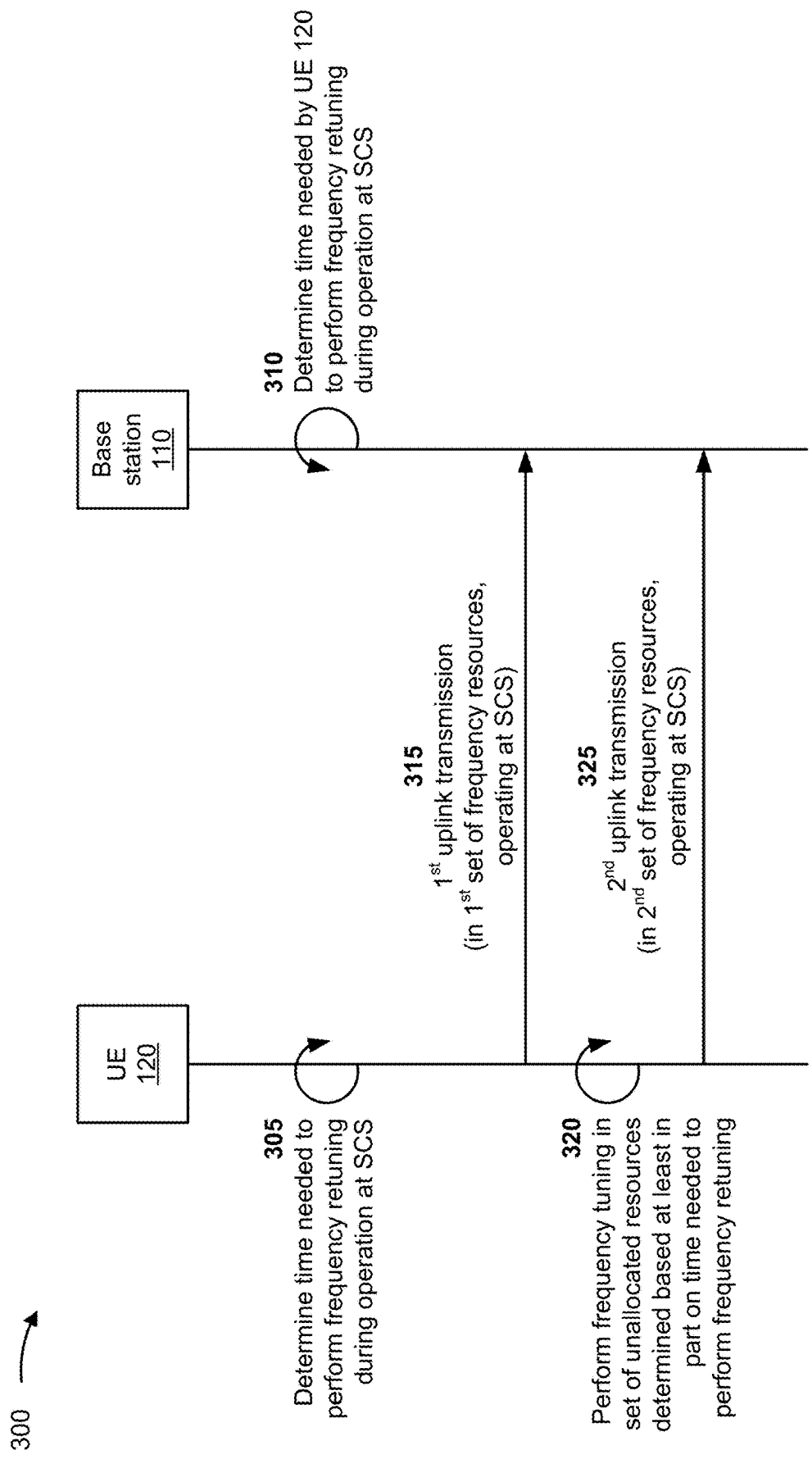
FIGS. 3A-3C are diagrams illustrating examples associated with uplink frequency hopping and scheduling, in accordance with the present disclosure.
Figure 3B:
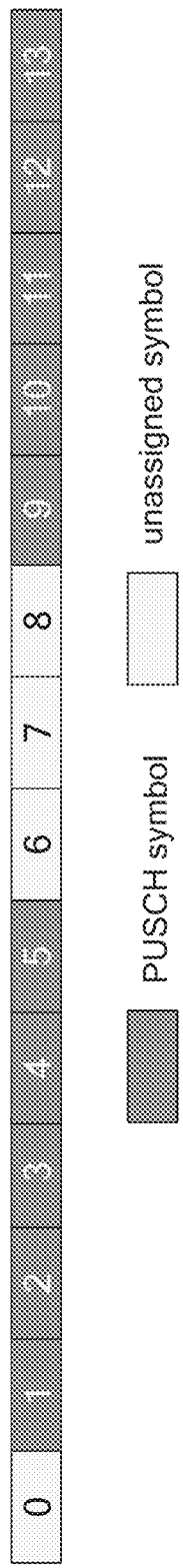
Figure 3C:
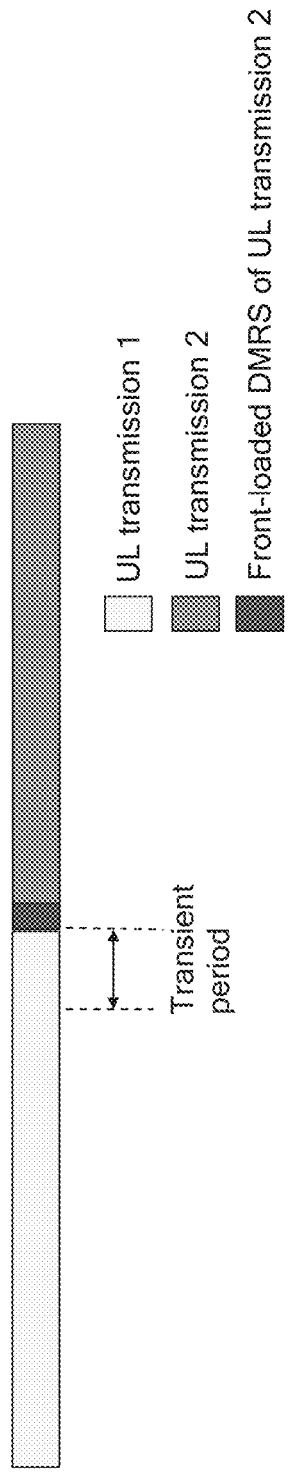

FIGS. 3A-3C are diagrams illustrating examples associated with uplink frequency hopping and scheduling, in accordance with the present disclosure. As shown in FIG. 3A by example 300, a base station 110 and a UE 120 may communicate with one another (e.g., via a wireless network 100).

As shown by reference 305, the UE 120 may determine an amount of time between uplink allocations that is needed for performing frequency retuning during operation of the UE 120 an SCS. In some aspects, the amount of time is a quantity of symbols needed by the UE 120 to perform frequency retuning during operation at the SCS. That is, in some aspects, the amount of time is in units of a number of symbols. In some aspects, the amount of time between uplink allocations that is needed by the UE 120 for performing frequency retuning is a quantity of time units needed to perform frequency retuning during operation at the SCS. That is, in some aspects, the amount of time is in the units of K $T_c$, where K is a positive integer value and $T_c$ is a defined unit of time (e.g., as defined by an applicable wireless communication standard).

In some aspects, the UE 120 may determine the amount of time based at least in part on one or more measurements performed by the UE 120. For example, the UE 120 may perform one or more measurements of the amount of time needed to perform frequency tuning during operation at the SCS, and may determine the amount of time accordingly (e.g., based on a result of a most recent measurement, based on averaging results of two or more measurements, or the like).

In some aspects, the UE 120 may determine the amount of time based at least in part on information stored or accessible by the UE 120. For example, the UE 120 may be configured with a table that maps SCSs to amounts of time needed for performing frequency retuning, and the UE 120 may determine the amount of time according to the configured table (e.g., by mapping the SCS to an amount of time indicated in the table). As another example, the UE 120 may be configured with an algorithm that receives, as an input, information that indicates the SCS and (optionally) information associated with one or more other characteristics of the UE 120, and provides, as an output, information that identifies the amount of time needed to perform frequency retuning.

In some aspects, the UE 120 may transmit, and the base station 110 may receive, information indicating the amount of time between uplink allocations that is needed by the UE 120 for performing frequency retuning during operation of the UE 120 at the SCS. That is, in some aspects, the UE 120 may signal the amount of time needed for performing frequency retuning to the base station 110. In some aspects, the information indicating the amount of time may be communicated (i.e., transmitted by the UE 120 and received by the base station 110) in a UE capability reporting communication. In some aspects, the information indicating the amount of time may be communicated via radio resource control (RRC) signaling (e.g., in UE 120 assistance information). In some aspects, the information indicating the amount of time may be communicated in a medium access control (MAC) control element (CE) (MAC-CE). In some aspects, the information indicating the amount of time may be communicated in uplink control information (UCI).

In some aspects, the UE 120 may determine the amount of time based at least in part on an indication received from the base station 110. For example, the base station 110 may be configured with a table that maps SCSs to amounts of time needed for performing frequency retuning, and the base station 110 may determine the amount of time according to the configured table (e.g., by mapping the SCS to an amount of time indicated in the table). The base station 110 may then transmit, and the UE 120 may receive, information indicating the amount of time. As another example, the base station 110 may be configured with an algorithm that receives, as an input, information that indicates the SCS and (optionally) information associated with one or more characteristics of the UE 120, and provides, as an output, information that identifies the amount of time needed by the UE 120 to perform frequency retuning. The base station 110 may determine the amount of time using the algorithm, and may transmit the information indicating the amount of time to the UE 120.

In some aspects, the UE 120 may determine the amount of time based at least in part on a suggested quantity of symbols associated with performing frequency retuning during operation at the SCS. For example, the UE 120 may transmit, and the base station 110 may receive, information indicating a suggested quantity of symbols associated with performing frequency retuning during operation of the UE 120 at the SCS. In some aspects, the UE 120 may determine the suggested quantity of symbols based at least in part on one or more measurements performed by the UE 120, based at least in part on a table configured on the UE 120, or in another manner. In this example, the base station 110 may determine the amount of time based at least in part on the suggested quantity of symbols (e.g., based at least in part on a table configured on the base station 110, an algorithm configured on the UE 120, a scheduling procedure configured on the base station 110, or the like), and may transmit, to the UE 120, information indicating the amount of time.

As shown by reference 310, the base station 110 may determine the amount of time between uplink allocations that is needed by the UE 120 for performing frequency retuning during operation of the UE 120 at the SCS. In some aspects, the base station 110 may determine the amount of time based at least in part on the UE 120 transmitting information indicating the amount of time. In some aspects, the base station 110 may determine the amount of time based at least in part on the UE 120 signaling a suggested quantity of symbols, and determining the amount of time based at least in part on the suggested quantity of symbols. In some aspects, the base station 110 may determine the amount of time based at least in part on a table or algorithm stored or accessible by the base station 110. In some aspects, the base station 110 may determine the amount of time in a manner similar to that described above in association with reference 305.

As shown by reference 315, the UE 120 may transmit a first uplink transmission in a first set of frequency resources during operation at the SCS. For example, the base station 110 may transmit, and the UE 120 may receive, scheduling information (e.g., DCI, a configured grant, or the like) indicates a resource allocation for the first uplink transmission in the first set of frequency resources, and the UE 120 may transmit, and the base station 110 may receive, the first uplink transmission in the first set of uplink resources accordingly.

As shown by reference 320, the UE 120 may perform frequency retuning associated with hopping from the first set of frequency resources to a second set of frequency resources during operation at the SCS. That is, the UE 120 may tune an RF module of the UE 120 and hop from a first frequency to a second frequency (e.g., to enable the UE 120 to transmit a second uplink transmission in a second set of frequency resources). In some aspects, the UE 120 performs the frequency retuning at least partially during a set of consecutive unallocated resources (e.g., a set of consecutive resources that is not allocated to the UE 120 for an uplink transmission). Additional details regarding the timing and performance of frequency tuning in the are provided below.

As shown by reference 325, the UE 120 may transmit, and the base station 110 may receive, the second uplink transmission in the second set of frequency resources during operation at the SCS. For example, the base station 110 may transmit, and the UE 120 may receive, scheduling information (e.g., DCI, a configured grant, or the like) indicates a resource allocation for the second uplink transmission in the second set of frequency resources, and the UE 120 may transmit, and the base station 110 may receive, the second uplink transmission in the second set of uplink resources accordingly.

In some aspects, the base station 110 may receive the first uplink transmission or the second uplink transmission based at least in part on the amount of time between uplink allocations that is needed by the UE for performing frequency retuning during operation of the UE at the SCS. For example, the base station 110, having knowledge of the amount of time needed by the UE 120 for performing the frequency retuning, may puncture or rate match around one or more symbols of the first uplink transmission or the second uplink transmission. As another example, having knowledge of the amount of time, the base station 110 may identify symbols in which to expect to receive the first uplink transmission or the second uplink transmission (e.g., when the UE 120 is configured to automatically perform frequency retuning based at least in part on the amount of time). As another example, having knowledge of the amount of time, the base station 110 may receive the first uplink transmission or the second uplink based at least in part on scheduling the first uplink transmission or the second uplink transmission based at least in part on the amount of time.

With respect to the frequency retuning, in some aspects, the set of consecutive unallocated resources is a set of consecutive resources (e.g., consecutive symbols) that is not allocated to the UE 120 in association with transmitting uplink transmissions. In some aspects, the set of consecutive unallocated resources in which the frequency retuning is (at least partially) performed is determined by the base station 110 and is signaled to the UE 120 (e.g., when the base station 110 is configured to indicate a symbol at which the UE 120 is to initiate performance of the frequency retuning). In some aspects, the set of consecutive unallocated resources in which the frequency retuning is (at least partially) performed is determined by the UE 120 (e.g., when the UE 120 is configured to automatically perform frequency retuning in sets of unallocated resources that have a length that is greater than or equal to the amount of time needed by the UE 120 for performing the frequency retuning).

In some aspects, the set of consecutive unallocated resources has a length that is less than the amount of time between uplink allocations that is needed for performing frequency retuning. That is, in some aspects, the set of unallocated resources is insufficient to enable the UE 120 to perform the frequency retuning without impacting transmission of the first uplink transmission or the second uplink transmission. In such a case, the UE 120 and the base station 110 may puncture or rate match around one or more symbols of the first uplink transmission or the second uplink transmission.

As noted above, in some aspects, one or more symbols of the first uplink transmission or one or more symbols of the second uplink transmission are punctured or rate matched around based at least in part on the amount of time between uplink allocations that is needed for performing frequency retuning. For example, the UE 120 and the base station 110 have knowledge of the amount of time needed by the UE 120 to perform the frequency retuning, as described above. Thus, based on the amount of time, the UE 120 and the base station 110 can puncture or rate match around symbols (e.g., one or more symbols associated with the first uplink or one or more symbols associated with the second uplink transmission) that fall within a time period corresponding to the amount of time when the set of unallocated resources has a length that is shorter than the amount of time. More particularly, the UE 120 and the base station 110 can be configured to puncture or rate match around one or more (last) symbols of the first uplink transmission or one or more (first) symbols of the second uplink transmission that are within a time period during which the UE 120 performs the frequency tuning in a scenario in which the set of unallocated resources is shorter than the amount of time needed by the UE 120 for performing frequency retuning. In this way, knowledge of the amount of time can enable one or more symbols of the first uplink and/or one or more symbols of the second uplink to be punctured or rate matched around, thereby reducing a likelihood of decoding failure at the base station 110 and improving reliability.

In some aspects, the set of consecutive unallocated resources has a length that is greater than or equal to the amount of time between uplink allocations that is needed for performing frequency retuning. Thus, in some aspects, the set of unallocated resources is sufficient to enable the UE 120 to perform the frequency retuning without impacting transmission of the first uplink transmission or the second uplink transmission.

For example, in some aspects, the UE 120 may be configured to perform the frequency retuning associated with hopping from the first set of frequency resources to the second set of frequency resources at a set of consecutive unallocated symbols (e.g., a TDRA gap) that has a length that is greater than or equal to the amount of time needed by the UE 120 for performing the frequency retuning (e.g., the amount of time as determined by the UE 120 based at least in part determination by the UE 120, an indication from the base station 110, a suggested quantity of symbols determined and communicated by the UE 120, or the like). As particular example, the UE 120 may be configured to automatically perform frequency hopping is performed at a TDRA gap that has at least m unassigned symbols, where m corresponds to the amount of time needed by the UE 120 for performing the frequency retuning during operation at the SCS. Thus, based on the SCS and identified sets of consecutive unallocated symbols (e.g., TDRA gaps), the UE 120 can perform frequency tuning during a period of time of sufficient length to reduce or eliminate an impact of the frequency retuning on the first and the second uplink transmissions. In this way, information indicating the amount of time needed by the UE 120 for performing the frequency retuning enables the time period during which to perform frequency tuning to be selected so as to reduce a likelihood of decoding failure at the base station 110.

FIG. 3B is a diagram illustrating an example of a TDRA gap (e.g., a TDRA at which the UE 120 may perform frequency retuning). As noted above, a row of a TDRA table can indicate up to eight PUSCH allocations, and the PUSCH allocations can be continuous or non-continuous in the time-domain. In such a case, each PUSCH allocation has a separate SLIV and mapping type, and the number of scheduled PUSCH allocations is implicitly indicated by the number of indicated valid SLIVs in the row of the TDRA table. As an example, a row of the TDRA table corresponding to the example slot shown in FIG. 3B indicates a first SLIV of (1,5) (e.g., (S, L)=(1,5)) and a second SLIV of (9,5) (e.g., (S, L)=(9,5)). Thus, the row of the TDRA table indicates that there are two PUSCH allocations, where a first PUSCH allocation starts in symbol 1 and has a length of five symbols, and a second PUSCH allocation starts in symbol 9 and has a length of five symbols. In some aspects, the slot as the starting slot for the multi-PUSCH allocation from the scheduling DCI (identified by a so-called a k2 value) may also be signaled to the UE 120. Notably, in the example shown in FIG. 3B, there is a TDRA gap of three symbols (in symbols 6, 7, and 8) between the uplink allocations. Thus, the UE 120 may perform frequency retuning in the TDRA gap when, for example, the amount of time needed by the UE 120 to perform the frequency retuning (e.g., the value of m configured on the UE 120) is less than or equal to three symbols.

In some aspects, the UE 120 may be configured to perform the frequency retuning associated with hopping from the first set of resources to the second set of resources at a symbol indicated by the base station 110 (e.g., via DCI). For example, the base station 110 may transmit, and the UE 120 may receive, DCI indicating a symbol at which to perform frequency retuning in association with hopping from the first set of frequency resources to the second set of frequency resources during operation at the SCS, and the UE 120 may perform the frequency retuning at the indicated symbol. Thus, in some aspects, in association with scheduling the UE 120 to transmit the first uplink transmission in the first set of uplink resources and the second uplink transmission in the second set of resources, the base station 110 may determine the symbol at which the UE 120 is to perform frequency hopping.

In some aspects, the symbol at which the frequency retuning is to be performed is determined based at least in part on the amount of time needed by the UE 120 for performing the frequency retuning. For example, in association with scheduling the first uplink transmission and the second uplink transmission, the base station 110 may identify (e.g., based at least in part on the suggested quantity of symbols indicated by the UE 120) a symbol that will enable the UE 120 to perform frequency tuning (e.g., to hop from the first set of resources to the second set of resources) during a set of consecutive unallocated symbols (e.g., a TDRA gap) having a quantity of symbols that is greater than or equal to the amount of time needed by the UE 120. In some aspects, identifying such a symbol enables the UE 120 to transmit the first uplink transmission and the second uplink transmission without missing any symbols (e.g., such that no symbols of the first uplink transmission or the second uplink transmission will fall within a time period corresponding to the frequency tuning delay) or missing a low number of symbols (e.g., a number of symbols that may not impact decoding performance).

In some aspects, the base station 110 may be configured to schedule the frequency hopping during a set of unallocated resources (e.g., a TDRA gap). In some aspects, the UE 120 is configured not expect to receive frequency hopping outside of a set of unallocated resources (e.g., the UE 120 may treat an indication to perform a frequency hop outside of a TDRA gap as an error). That is, the base station 110 may in some aspects be restricted to scheduling the frequency hopping during only a set of unallocated resources. Thus, the base station 110 can cause the UE 120 to perform frequency tuning during a period of time of sufficient length to reduce or eliminate an impact of the frequency tuning on the first uplink and the second uplink transmission. In this way, knowledge of the amount of time needed by the UE 120 for performing the frequency retuning enables the symbol at which to initiate performing the frequency retuning to be selected so as to reduce a likelihood of decoding failure at the base station 110.

In some aspects, such as in a back-to-back uplink transmission scenario in which one or more symbols of the first or second uplink transmission are punctured or rate matched around, a transient period associated with performing the frequency retuning may be at a boundary of a DMRS symbol or at a boundary of an uplink transmission (e.g., the first uplink transmission or the second uplink) associated with the DMRS symbol. For example, if splitting the transient period associated with performing the frequency retuning between the first uplink transmission and the second uplink transmission causes an overlap with a DMRS symbol, then the transient period may be at a boundary of the DMRS symbol or at a boundary of an uplink transmission having the DMRS symbol. FIG. 3C is a diagram illustrating an example timing of a transient period associated with performing the frequency retuning when splitting the transient period would cause an overlap with a DMRS symbol. In the example shown in FIG. 3C, splitting the transient period between the first uplink transmission (e.g., UL transmission 1) and the second uplink transmission (e.g., UL transmission 2) would cause an overlap with a front-loaded DMRS symbol of the second uplink transmission. Therefore, as illustrated in FIG. 3C, the transient period may be shifted to the boundary of the second uplink transmission (i.e., the uplink transmission with the DMRS symbol).

Alternatively, the DMRS symbol may be moved to a first unpunctured symbol, and the equally-split transient period (e.g., between the first and second uplink transmissions) may be is maintained. Thus, in some aspects, a transient period associated with performing the frequency retuning is split between the first uplink transmission and the second uplink transmission, and a DMRS symbol is communicated in a first unpunctured symbol of the second uplink transmission.

Notably, one or more of the above described aspects can be applied in a scenario of frequency hopping for a multi-PUSCH scheduling grant, a scenario of frequency hopping for PUSCH transmissions, and a scenario of frequency hopping for back-to-back uplink transmissions (e.g., PUSCH-PUCCH, PUSCH-SRS, or the like).

As indicated above, FIGS. 3A-3C are provided as examples. Other examples may differ from what is described with respect to FIGS. 3A-3C.

Figure 4:
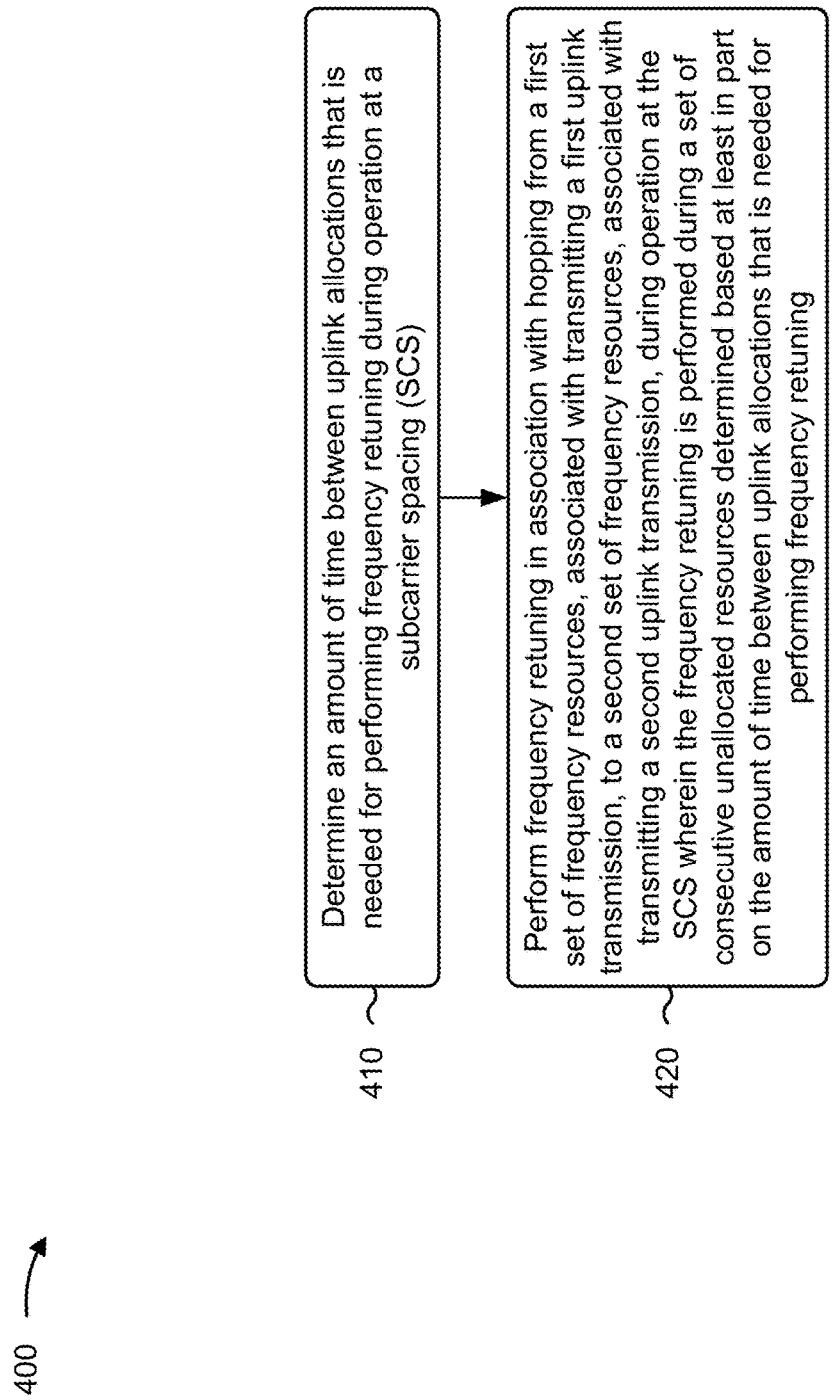
FIGS. 4 and 5 are diagrams illustrating example processes associated with uplink frequency hopping and scheduling, in accordance with the present disclosure.

FIG. 4 is a diagram illustrating an example process 400 performed, for example, by a UE, in accordance with the present disclosure. Example process 400 is an example where the UE (e.g., UE 120) performs operations associated with uplink frequency hopping and scheduling.

As shown in FIG. 4, in some aspects, process 400 may include determining an amount of time between uplink allocations that is needed for performing frequency retuning during operation at an SCS (block 410). For example, the UE (e.g., using communication manager 140 and/or determination component 608, depicted in FIG. 6) may determine an amount of time between uplink allocations that is needed for performing frequency retuning during operation at an SCS, as described above.

As further shown in FIG. 4, in some aspects, process 400 may include performing frequency retuning in association with hopping from a first set of frequency resources, associated with transmitting a first uplink transmission, to a second set of frequency resources, associated with transmitting a second uplink transmission, during operation at the SCS, wherein the frequency retuning is performed during a set of consecutive unallocated resources determined based at least in part on the amount of time between uplink allocations that is needed for performing frequency retuning (block 420). For example, the UE (e.g., using communication manager 140 and/or frequency retuning component 610, depicted in FIG. 6) may perform frequency retuning in association with hopping from a first set of frequency resources, associated with transmitting a first uplink transmission, to a second set of frequency resources, associated with transmitting a second uplink transmission, during operation at the SCS, as described above. In some aspects, the frequency retuning is performed during a set of consecutive unallocated resources determined based at least in part on the amount of time between uplink allocations that is needed for performing frequency retuning.

Process 400 may include additional aspects, such as any single aspect or any combination of aspects described below and/or in connection with one or more other processes described elsewhere herein.

In a first aspect, process 400 includes transmitting information indicating the amount of time between uplink allocations that is needed for performing frequency retuning.

In a second aspect, alone or in combination with the first aspect, the amount of time between uplink allocations that is needed for performing frequency retuning is a quantity of symbols needed to perform frequency retuning during operation at the SCS.

In a third aspect, alone or in combination with one or more of the first and second aspects, the amount of time between uplink allocations that is needed for performing frequency retuning is a quantity of time units needed to perform frequency retuning during operation at the SCS.

In a fourth aspect, alone or in combination with one or more of the first through third aspects, the set of consecutive unallocated resources has a length that is greater than or equal to the amount of time between uplink allocations that is needed for performing frequency retuning.

In a fifth aspect, alone or in combination with one or more of the first through fourth aspects, one or more symbols of the first uplink transmission in the first set of frequency resources or one or more symbols of the second uplink transmission in the second set of frequency resources are punctured or rate matched around based at least in part on the amount of time between uplink allocations that is needed for performing frequency retuning.

In a sixth aspect, alone or in combination with one or more of the first through fifth aspects, the amount of time between uplink allocations that is needed for performing frequency retuning is determined based at least in part on a table, stored by the UE, that maps the SCS to the amount of time between uplink allocations that is needed for performing frequency retuning.

In a seventh aspect, alone or in combination with one or more of the first through sixth aspects, the amount of time between uplink allocations that is needed for performing frequency retuning is determined based at least in part on an indication received from a base station.

In an eighth aspect, alone or in combination with one or more of the first through seventh aspects, process 400 includes transmitting information indicating a suggested quantity of symbols associated with performing frequency retuning during operation at the SCS.

In a ninth aspect, alone or in combination with one or more of the first through eighth aspects, process 400 includes receiving information indicating the amount of time between uplink allocations that is needed for performing frequency retuning, the amount of time being based at least in part on the suggested quantity of symbols.

In a tenth aspect, alone or in combination with one or more of the first through ninth aspects, process 400 includes receiving DCI indicating a symbol at which to perform the frequency retuning in association with hopping from the first set of frequency resources to the second set of frequency resources, wherein the symbol at which the frequency retuning is to be performed is based at least in part on the suggested quantity of symbols.

In an eleventh aspect, alone or in combination with one or more of the first through tenth aspects, the UE does not expect to receive an indication to perform frequency hopping outside of sets of unallocated resources.

In a twelfth aspect, alone or in combination with one or more of the first through eleventh aspects, process 400 includes transmitting the first uplink transmission and the second uplink transmission, the first uplink transmission and the second uplink transmission being scheduled based at least in part on the amount of time between uplink allocations that is needed for performing frequency retuning.

In a thirteenth aspect, alone or in combination with one or more of the first through twelfth aspects, a transient period associated with performing the frequency retuning is at a boundary of a DMRS symbol or at a boundary of an uplink transmission associated with the DMRS symbol.

In a fourteenth aspect, alone or in combination with one or more of the first through thirteenth aspects, a transient period associated with performing the frequency retuning is split between the first uplink transmission and the second uplink transmission, and a DMRS symbol is transmitted in a first unpunctured symbol of the second uplink transmission.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
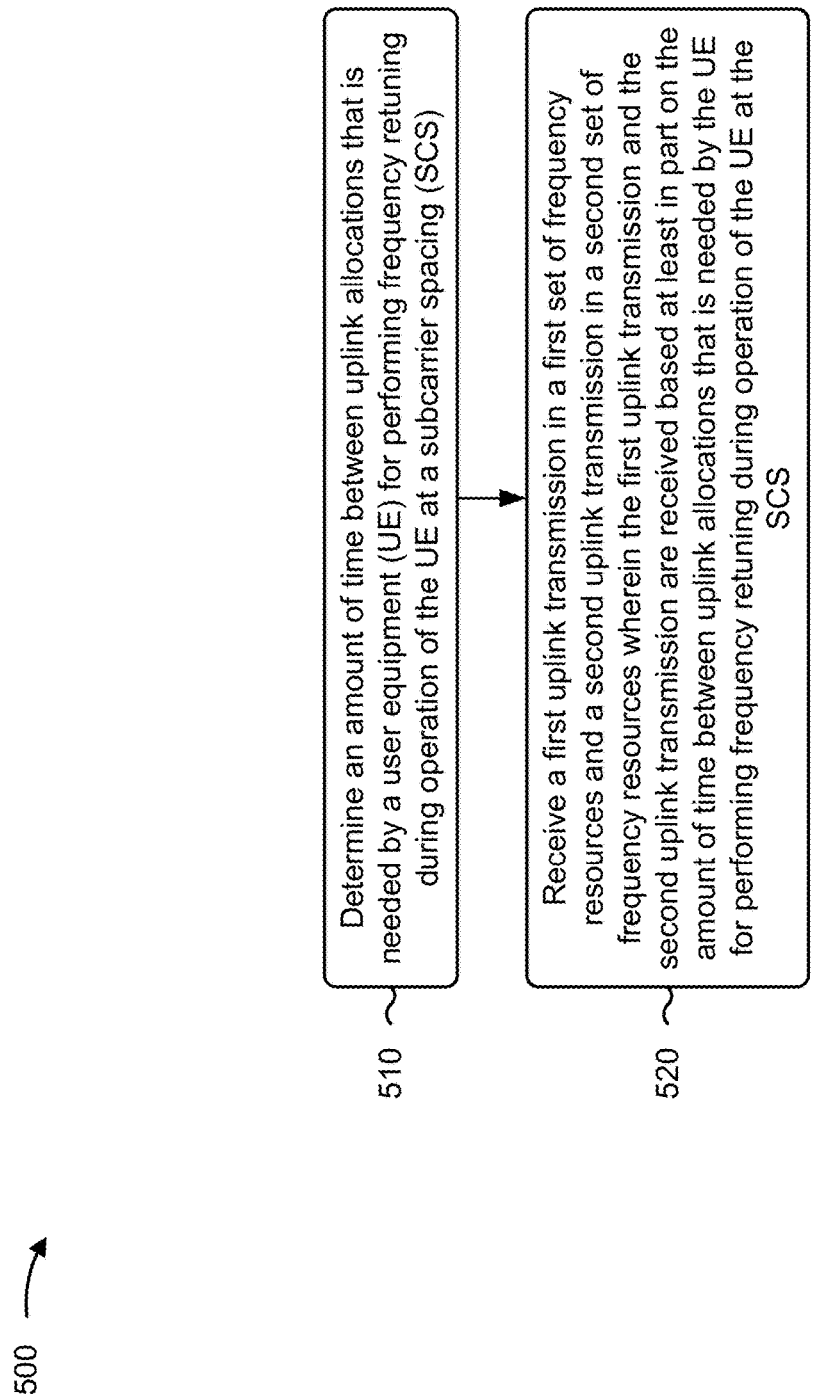

FIG. 5 is a diagram illustrating an example process 500 performed, for example, by a base station, in accordance with the present disclosure. Example process 500 is an example where the base station (e.g., base station 110) performs operations associated with uplink frequency hopping and scheduling.

As shown in FIG. 5, in some aspects, process 500 may include determining an amount of time between uplink allocations that is needed by a user equipment (UE) for performing frequency retuning during operation of the UE at a subcarrier spacing (SCS) (block 510). For example, the base station (e.g., using communication manager 150 and/or determination component 708, depicted in FIG. 7) may determine an amount of time between uplink allocations that is needed by a UE (e.g., UE 120) for performing frequency retuning during operation of the UE at an SCS, as described above.

As further shown in FIG. 5, in some aspects, process 500 may include receiving a first uplink transmission in a first set of frequency resources and a second uplink transmission in a second set of frequency resources, wherein the first uplink transmission and the second uplink transmission are received based at least in part on the amount of time between uplink allocations that is needed by the UE for performing frequency retuning during operation of the UE at the SCS (block 520). For example, the base station (e.g., using communication manager 150 and/or reception component 702, depicted in FIG. 7) may receive a first uplink transmission in a first set of frequency resources and a second uplink transmission in a second set of frequency resources, as described above. In some aspects, the first uplink transmission and the second uplink transmission are received based at least in part on the amount of time between uplink allocations that is needed by the UE for performing frequency retuning during operation of the UE at the SCS.

Process 500 may include additional aspects, such as any single aspect or any combination of aspects described below and/or in connection with one or more other processes described elsewhere herein.

In a first aspect, process 500 includes receiving information indicating the amount of time between uplink allocations that is needed by the UE for performing frequency retuning.

In a second aspect, alone or in combination with the first aspect, the amount of time between uplink allocations that is needed by the UE for performing frequency retuning is a quantity of symbols needed by the UE to perform frequency retuning during operation at the SCS.

In a third aspect, alone or in combination with one or more of the first and second aspects, the amount of time between uplink allocations that is needed by the UE for performing frequency retuning is a quantity of time units needed by the UE to perform frequency retuning during operation at the SCS.

In a fourth aspect, alone or in combination with one or more of the first through third aspects, one or more symbols of an uplink transmission in a first set of frequency resources or one or more symbols of an uplink transmission in a second set of frequency resources are punctured or rate matched around based at least in part on the amount of time between uplink allocations that is needed by the UE for performing frequency retuning.

In a fifth aspect, alone or in combination with one or more of the first through fourth aspects, the amount of time between uplink allocations that is needed by the UE for performing frequency retuning is determined based at least in part on a table, stored by the base station, that maps the SCS to the amount of time between uplink allocations that is needed by the UE for performing frequency retuning.

In a sixth aspect, alone or in combination with one or more of the first through fifth aspects, process 500 includes transmitting an indication of the amount of time between uplink allocations that is needed by the UE for performing frequency retuning to the UE.

In a seventh aspect, alone or in combination with one or more of the first through sixth aspects, process 500 includes receiving information indicating a suggested quantity of symbols associated with performing frequency retuning during operation of the UE at the SCS.

In an eighth aspect, alone or in combination with one or more of the first through seventh aspects, process 500 includes transmitting information indicating the amount of time between uplink allocations that is needed by the UE for performing frequency retuning, the amount of time being determined based at least in part on the suggested quantity of symbols.

In a ninth aspect, alone or in combination with one or more of the first through eighth aspects, process 500 includes transmitting DCI indicating a symbol at which the UE is to perform frequency retuning in association with hopping from the first set of frequency resources to the second set of frequency resources, wherein the symbol at which the frequency retuning is to be performed is determined based at least in part on the suggested quantity of symbols.

In a tenth aspect, alone or in combination with one or more of the first through ninth aspects, the first uplink transmission and the second uplink transmission are scheduled such that an amount of time between the first uplink transmission and the second uplink transmission is greater than or equal to the amount of time between uplink allocations that is needed by the UE for performing frequency retuning.

In an eleventh aspect, alone or in combination with one or more of the first through tenth aspects, a transient period associated with the UE performing a frequency retuning is at a boundary of a DMRS symbol or at a boundary of an uplink transmission associated with the DMRS symbol.

In a twelfth aspect, alone or in combination with one or more of the first through eleventh aspects, a transient period associated with the UE performing a frequency retuning is split between the first uplink transmission and the second uplink transmission, and a DMRS symbol is received in a first unpunctured symbol of the second uplink transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
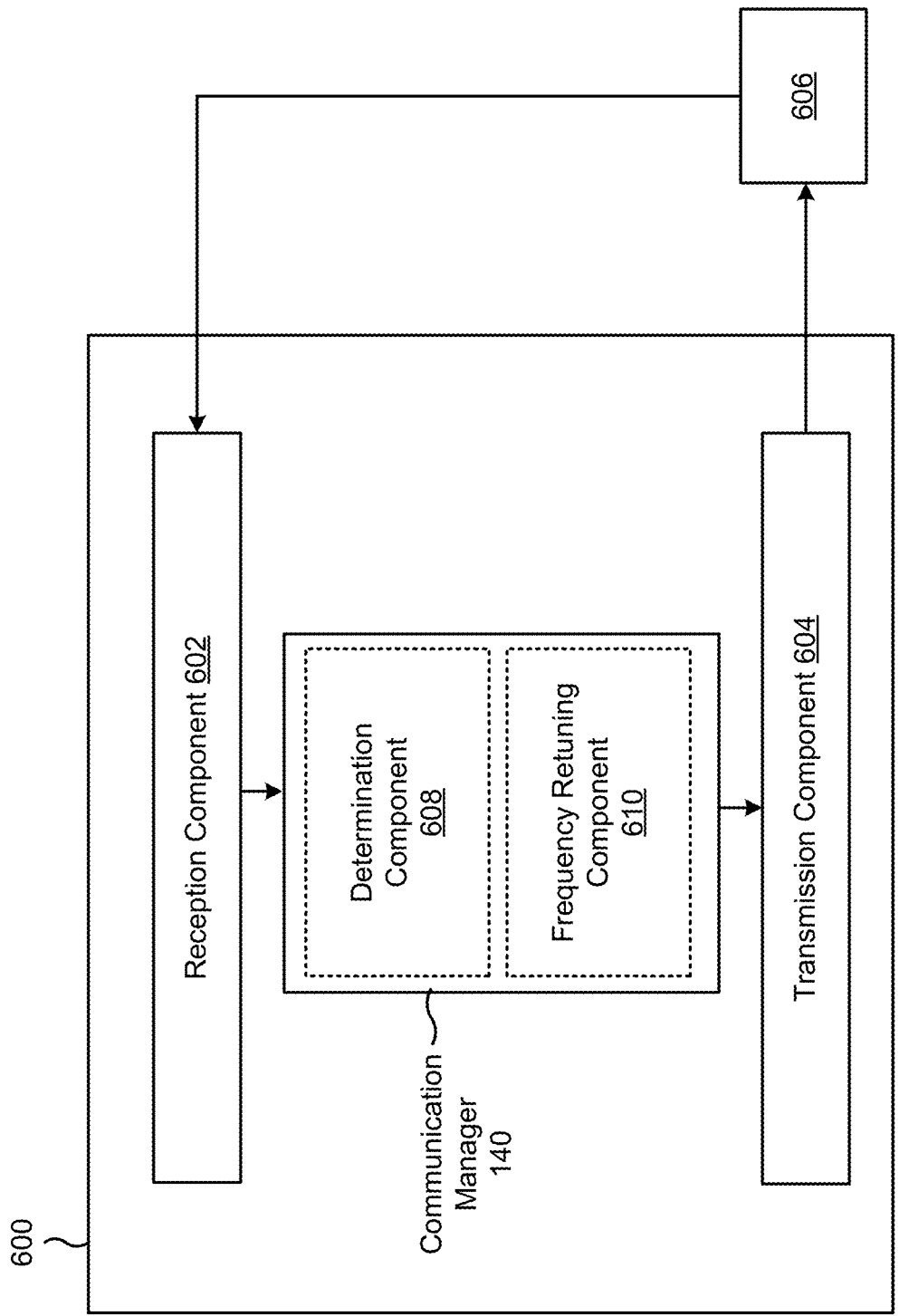
FIGS. 6 and 7 are diagrams of example apparatuses for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a determination component 608 or a frequency retuning component 610, among other examples.

In some aspects, the apparatus 600 may be configured to perform one or more operations described herein in connection with FIGS. 3A-3C. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The determination component 608 may determine an amount of time between uplink allocations that is needed for performing frequency retuning during operation at an SCS. The frequency retuning component 610 may perform frequency retuning in association with hopping from a first set of frequency resources, associated with transmitting a first uplink transmission, to a second set of frequency resources, associated with transmitting a second uplink transmission, during operation at the SCS wherein the frequency retuning is performed during a set of consecutive unallocated resources determined based at least in part on the amount of time between uplink allocations that is needed for performing frequency retuning.

The transmission component 604 may transmit information indicating the amount of time between uplink allocations that is needed for performing frequency retuning.

The transmission component 604 may transmit information indicating a suggested quantity of symbols associated with performing frequency retuning during operation at the SCS.

The reception component 602 may receive information indicating the amount of time between uplink allocations that is needed for performing frequency retuning, the amount of time being based at least in part on the suggested quantity of symbols.

The reception component 602 may receive DCI indicating a symbol at which to perform the frequency retuning in association with hopping from the first set of frequency resources to the second set of frequency resources wherein the symbol at which the frequency retuning is to be performed is based at least in part on the suggested quantity of symbols.

The transmission component 604 may transmit the first uplink transmission and the second uplink transmission, the first uplink transmission and the second uplink transmission being scheduled based at least in part on the amount of time between uplink allocations that is needed for performing frequency retuning.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
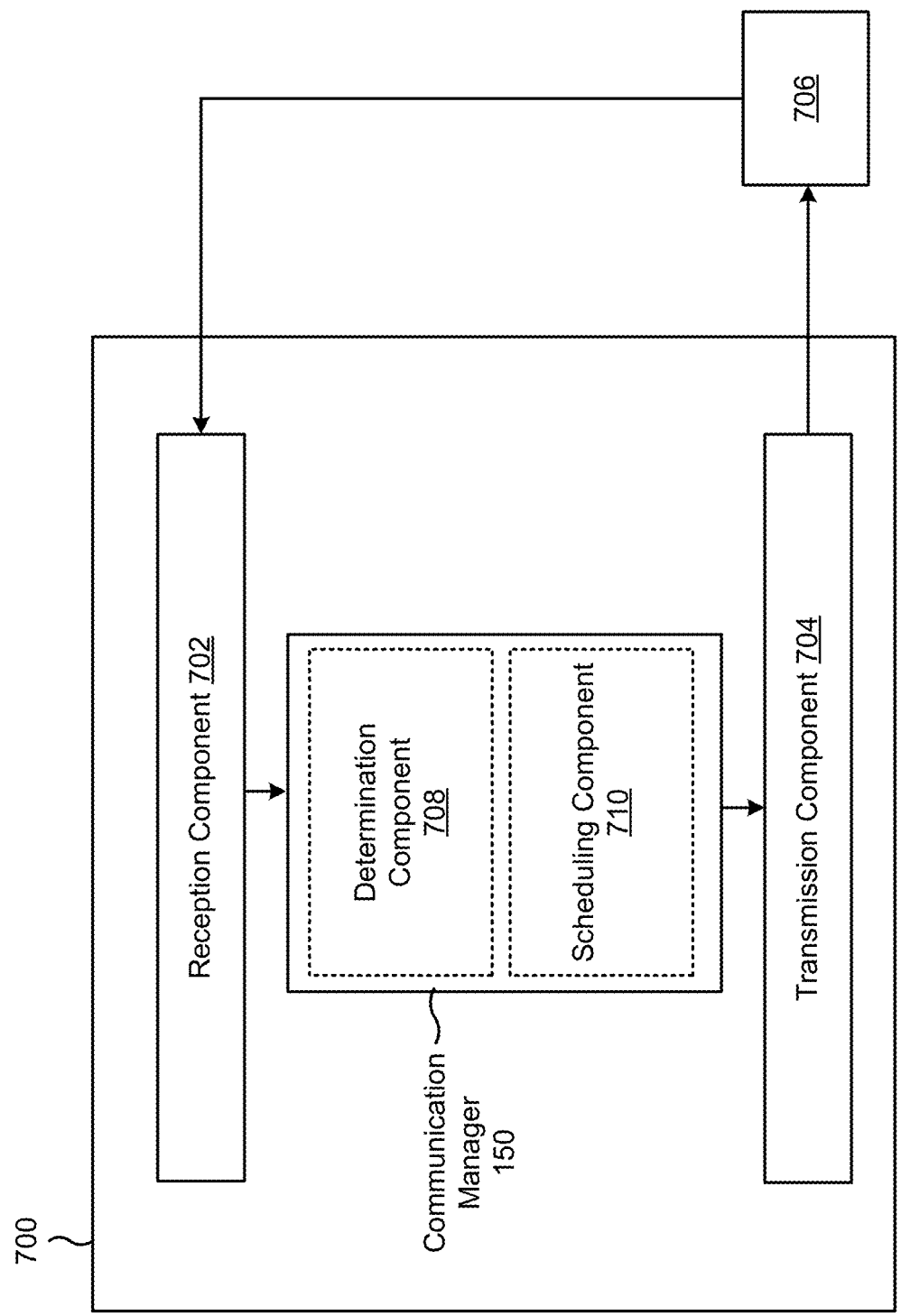

FIG. 7 is a diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150. The communication manager 150 may include one or more of a determination component 708 or a scheduling component 710, among other examples.

In some aspects, the apparatus 700 may be configured to perform one or more operations described herein in connection with FIGS. 3A-3C. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The determination component 708 may determine an amount of time between uplink allocations that is needed by a UE for performing frequency retuning during operation of the UE at an SCS. The reception component 702 may receive a first uplink transmission in a first set of frequency resources and a second uplink transmission in a second set of frequency resources wherein the first uplink transmission and the second uplink transmission are received based at least in part on the amount of time between uplink allocations that is needed by the UE for performing frequency retuning during operation of the UE at the SCS.

The reception component 702 may receive information indicating the amount of time between uplink allocations that is needed by the UE for performing frequency retuning.

The transmission component 704 may transmit an indication of the amount of time between uplink allocations that is needed by the UE for performing frequency retuning to the UE.

The reception component 702 may receive information indicating a suggested quantity of symbols associated with performing frequency retuning during operation of the UE at the SCS.

The transmission component 704 may transmit information indicating the amount of time between uplink allocations that is needed by the UE for performing frequency retuning, the amount of time being determined based at least in part on the suggested quantity of symbols.

The transmission component 704 may transmit DCI indicating a symbol at which the UE is to perform frequency retuning in association with hopping from the first set of frequency resources to the second set of frequency resources wherein the symbol at which the frequency retuning is to be performed is determined based at least in part on the suggested quantity of symbols.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: determining an amount of time between uplink allocations that is needed for performing frequency retuning during operation at an SCS; and performing frequency retuning in association with hopping from a first set of frequency resources, associated with transmitting a first uplink transmission, to a second set of frequency resources, associated with transmitting a second uplink transmission, during operation at the SCS, wherein the frequency retuning is performed during a set of consecutive unallocated resources determined based at least in part on the amount of time between uplink allocations that is needed for performing frequency retuning.

Aspect 2: The method of Aspect 1, further comprising transmitting information indicating the amount of time between uplink allocations that is needed for performing frequency retuning.

Aspect 3: The method of any of Aspects 1-2, wherein the amount of time between uplink allocations that is needed for performing frequency retuning is a quantity of symbols needed to perform frequency retuning during operation at the SCS.

Aspect 4: The method of any of Aspects 1-2, wherein the amount of time between uplink allocations that is needed for performing frequency retuning is a quantity of time units needed to perform frequency retuning during operation at the SCS.

Aspect 5: A method of any of Aspects 1-4, where the set of consecutive unallocated resources has a length that is greater than or equal to the amount of time between uplink allocations that is needed for performing frequency retuning.

Aspect 6: A method of any of Aspects 1-4, wherein one or more symbols of the first uplink transmission in the first set of frequency resources or one or more symbols of the second uplink transmission in the second set of frequency resources are punctured or rate matched around based at least in part on the amount of time between uplink allocations that is needed for performing frequency retuning.

Aspect 7: The method of any of Aspects 1-6, wherein the amount of time between uplink allocations that is needed for performing frequency retuning is determined based at least in part on a table, stored by the UE, that maps the SCS to the amount of time between uplink allocations that is needed for performing frequency retuning.

Aspect 8: The method of any of Aspects 1-7, wherein the amount of time between uplink allocations that is needed for performing frequency retuning is determined based at least in part on an indication received from a base station.

Aspect 9: The method of any of Aspects 1-8, further comprising transmitting information indicating a suggested quantity of symbols associated with performing frequency retuning during operation at the SCS.

Aspect 10: The method of Aspect 9, further comprising receiving information indicating the amount of time between uplink allocations that is needed for performing frequency retuning, the amount of time being based at least in part on the suggested quantity of symbols.

Aspect 11: The method of any of Aspects 9-10, further comprising receiving DCI indicating a symbol at which to perform the frequency retuning in association with hopping from the first set of frequency resources to the second set of frequency resources, wherein the symbol at which the frequency retuning is to be performed is based at least in part on the suggested quantity of symbols.

Aspect 12: The method of any of Aspects 1-11, wherein the UE does not expect to receive an indication to perform frequency hopping outside of sets of unallocated resources.

Aspect 13: The method of any of Aspects 1-12, further comprising transmitting the first uplink transmission and the second uplink transmission, the first uplink transmission and the second uplink transmission being scheduled based at least in part on the amount of time between uplink allocations that is needed for performing frequency retuning.

Aspect 14: The method of any of Aspects 1-13, wherein a transient period associated with performing the frequency retuning is at a boundary of a DMRS symbol or at a boundary of an uplink transmission associated with the DMRS symbol.

Aspect 15: The method of any of Aspects 1-13, wherein a transient period associated with performing the frequency retuning is split between the first uplink transmission and the second uplink transmission, and a DMRS symbol is transmitted in a first unpunctured symbol of the second uplink transmission.

Aspect 16: A method of wireless communication performed by a base station, comprising: determining an amount of time between uplink allocations that is needed by a UE for performing frequency retuning during operation of the UE at an SCS; and receiving a first uplink transmission in a first set of frequency resources and a second uplink transmission in a second set of frequency resources, wherein the first uplink transmission and the second uplink transmission are received based at least in part on the amount of time between uplink allocations that is needed by the UE for performing frequency retuning during operation of the UE at the SCS.

Aspect 17: The method of Aspect 16, further comprising receiving information indicating the amount of time between uplink allocations that is needed by the UE for performing frequency retuning.

Aspect 18: The method of any of Aspects 16-17, wherein the amount of time between uplink allocations that is needed by the UE for performing frequency retuning is a quantity of symbols needed by the UE to perform frequency retuning during operation at the SCS.

Aspect 19: The method of any of Aspects 16-17, wherein the amount of time between uplink allocations that is needed by the UE for performing frequency retuning is a quantity of time units needed by the UE to perform frequency retuning during operation at the SCS.

Aspect 20: A method of any of Aspects 16-19, wherein one or more symbols of an uplink transmission in a first set of frequency resources or one or more symbols of an uplink transmission in a second set of frequency resources are punctured or rate matched around based at least in part on the amount of time between uplink allocations that is needed by the UE for performing frequency retuning.

Aspect 21: The method of any of Aspects 16-20, wherein the amount of time between uplink allocations that is needed by the UE for performing frequency retuning is determined based at least in part on a table, stored by the base station, that maps the SCS to the amount of time between uplink allocations that is needed by the UE for performing frequency retuning.

Aspect 22: The method of any of Aspects 16-21, further comprising transmitting an indication of the amount of time between uplink allocations that is needed by the UE for performing frequency retuning to the UE.

Aspect 23: The method of any of Aspects 16-22, further comprising receiving information indicating a suggested quantity of symbols associated with performing frequency retuning during operation of the UE at the SCS.

Aspect 24: The method of Aspect 23, further comprising transmitting information indicating the amount of time between uplink allocations that is needed by the UE for performing frequency retuning, the amount of time being determined based at least in part on the suggested quantity of symbols.

Aspect 25: The method of any of Aspects 23-24, further comprising transmitting DCI indicating a symbol at which the UE is to perform frequency retuning in association with hopping from the first set of frequency resources to the second set of frequency resources, wherein the symbol at which the frequency retuning is to be performed is determined based at least in part on the suggested quantity of symbols.

Aspect 26: The method of any of Aspects 16-25, wherein the first uplink transmission and the second uplink transmission are scheduled such that an amount of time between the first uplink transmission and the second uplink transmission is greater than or equal to the amount of time between uplink allocations that is needed by the UE for performing frequency retuning.

Aspect 27: The method of any of Aspects 16-26, wherein a transient period associated with the UE performing a frequency retuning is at a boundary of a DMRS symbol or at a boundary of an uplink transmission associated with the DMRS symbol.

Aspect 28: The method of any of Aspects 16-26, wherein a transient period associated with the UE performing a frequency retuning is split between the first uplink transmission and the second uplink transmission, and a DMRS symbol is received in a first unpunctured symbol of the second uplink transmission.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
determine an amount of time, between uplink allocations that is needed for performing a frequency retuning associated with hopping from a first set of frequency resources to a second set of frequency resources during operation at a subcarrier spacing (SCS), based at least in part on a mapping of the SCS to the amount of time between the uplink allocations that is needed for performing the frequency retuning,
wherein the first set of frequency resources is associated with transmitting a first uplink transmission, and the second set of frequency resources is associated with transmitting-a second uplink transmission, and
wherein the mapping of the SCS to the amount of time between the uplink allocations that is needed for performing the frequency retuning is one of mappings, of SCSs to amounts of time needed for performing the frequency retuning, stored by the UE;
transmit, after determining the amount of time between the uplink allocations that is needed for performing the frequency retuning, the first uplink transmission in the first set of frequency resources;
transmit information indicating a suggested quantity of symbols associated with performing the frequency retuning;
receive, based at least in part on transmitting the suggested quantity of symbols, downlink control information (DCI) indicating a symbol at which to perform the frequency retuning; and
perform, after transmitting the first uplink transmission and at the symbol, the frequency retuning,
wherein the frequency retuning is performed during a set of consecutive unallocated resources determined based at least in part on the amount of time between the uplink allocations that is needed for performing the frequency retuning.

2. The UE of claim 1, wherein the one or more processors are further configured to transmit information indicating the amount of time between uplink allocations that is needed for performing the frequency retuning.

3. The UE of claim 1, wherein the amount of time between uplink allocations that is needed for performing the frequency retuning is a quantity of symbols needed for performing the frequency retuning.

4. The UE of claim 1, wherein the amount of time between uplink allocations that is needed for performing the frequency retuning is a quantity of time units.

5. The UE of claim 1, wherein the set of consecutive unallocated resources has a length that is greater than or equal to the amount of time between uplink allocations that is needed for performing the frequency retuning.

6. The UE of claim 1, wherein one or more symbols of the first uplink transmission in the first set of frequency resources or one or more symbols of the second uplink transmission in the second set of frequency resources are punctured or rate matched based at least in part on the amount of time between uplink allocations that is needed for performing the frequency retuning.

7. The UE of claim 1, wherein the amount of time between uplink allocations that is needed for performing the frequency retuning is further determined based at least in part on an indication received from an apparatus.

8. The UE of claim 1, wherein the UE does not expect to receive an indication to perform the frequency retuning outside of sets of unallocated resources.

9. The UE of claim 1, wherein the one or more processors are further configured to transmit the second uplink transmission, the first uplink transmission and the second uplink transmission being scheduled based at least in part on the amount of time between uplink allocations that is needed for performing the frequency retuning.

10. The UE of claim 1, wherein a transient period associated with performing the frequency retuning is at a boundary of a demodulation reference signal (DMRS) symbol or at a boundary of the first uplink transmission or the second uplink transmission.

11. The UE of claim 1, wherein a transient period associated with performing the frequency retuning is split between the first uplink transmission and the second uplink transmission, and a demodulation reference signal (DMRS) symbol is transmitted in a first unpunctured symbol of the second uplink transmission.

12. An apparatus for wireless communication, comprising:
one or more memories; and
one or more processors, coupled to the one or more memories, configured to:
determine an amount of time, between uplink allocations that is needed by a user equipment (UE) for performing a frequency retuning associated with hopping from a first set of frequency resources to a second set of frequency resources during operation of the UE at a subcarrier spacing (SCS), based at least in part on a mapping of the SCS to the amount of time between the uplink allocations that is needed for performing the frequency retuning,
wherein the first set of frequency resources is associated with transmitting a first uplink transmission, and the second set of frequency resources is associated with transmitting-a second uplink transmission, and
wherein the mapping of the SCS to the amount of time between the uplink allocations that is needed for performing the frequency retuning is one of mappings, of SCSs to amounts of time needed for performing the frequency returning, stored by the UE; and
receive information indicating a suggested quantity of symbols associated with performing the frequency retuning;
transmit, based at least in part on transmitting the suggested quantity of symbols, downlink control information (DCI) indicating a symbol at which to perform the frequency retuning; and
receive the first uplink transmission in the first set of frequency resources and the second uplink transmission in a the second set of frequency resources, wherein the first uplink transmission and the second uplink transmission are received based at least in part on the amount of time between the uplink allocations that is needed by the UE for performing the frequency retuning,
wherein the second uplink transmission is received at the symbol.

13. The apparatus of claim 12, wherein the one or more processors are further configured to receive information indicating the amount of time between uplink allocations that is needed by the UE for performing the frequency retuning.

14. The apparatus of claim 12, wherein the amount of time between uplink allocations that is needed by the UE for performing the frequency retuning is a quantity of symbols needed by the UE for performing the frequency retuning.

15. The apparatus of claim 12, wherein the amount of time between uplink allocations that is needed by the UE for performing the frequency retuning is a quantity of time units.

16. The apparatus of claim 12, wherein one or more symbols of the first uplink transmission in the first set of frequency resources or one or more symbols of the second uplink transmission in the second set of frequency resources are punctured or rate matched based at least in part on the amount of time between uplink allocations that is needed by the UE for performing the frequency retuning.

17. The apparatus of claim 12, wherein the one or more processors are further configured to transmit an indication of the amount of time between uplink allocations that is needed by the UE for performing the frequency retuning.

18. The apparatus of claim 12, wherein the first uplink transmission and the second uplink transmission are scheduled such that an amount of time between the first uplink transmission and the second uplink transmission is greater than or equal to the amount of time between uplink allocations that is needed by the UE for performing the frequency retuning.

19. The apparatus of claim 12, wherein a transient period associated with the UE performing the frequency retuning is at a boundary of a demodulation reference signal (DMRS) symbol or at a boundary of the first uplink transmission or the second uplink transmission.

20. The apparatus of claim 12, wherein a transient period associated with the UE performing a frequency retuning is split between the first uplink transmission and the second uplink transmission, and a demodulation reference signal (DMRS) symbol is received in a first unpunctured symbol of the second uplink transmission.

21. A method of wireless communication performed by a user equipment (UE), comprising:
determining an amount of time, between uplink allocations that is needed for performing a frequency retuning associated with hopping from a first set of frequency resources to a second set of frequency resources during operation at a subcarrier spacing (SCS), based at least in part on a mapping of the SCS to the amount of time between the uplink allocations that is needed for performing the frequency retuning,
wherein the first set of frequency resources is associated with transmitting a first uplink transmission, and the second set of frequency resources is associated with transmitting-a second uplink transmission, and
wherein the mapping of the SCS to the amount of time between the uplink allocations that is needed for performing the frequency retuning is one of mappings, of SCSs to amounts of time needed for performing the frequency returning, stored by the UE;
transmitting, after determining the amount of time between the uplink allocations that is needed for performing the frequency retuning, the first uplink transmission in the first set of frequency resources;
transmitting information indicating a suggested quantity of symbols associated with performing the frequency retuning;
receiving, based at least in part on transmitting the suggested quantity of symbols, downlink control information (DCI) indicating a symbol at which to perform the frequency retuning; and
performing, after transmitting the first uplink transmission and at the symbol, the frequency retuning,
wherein the frequency retuning is performed during a set of consecutive unallocated resources determined based at least in part on the amount of time between the uplink allocations that is needed for performing the frequency retuning.

22. The method of claim 21, wherein the amount of time between uplink allocations that is needed for performing the frequency retuning is a quantity of time units.

23. The method of claim 21, wherein the UE does not expect to receive an indication to perform the frequency retuning outside of sets of unallocated resources.

24. The method of claim 21, further comprising transmitting the second uplink transmission, the first uplink transmission and the second uplink transmission being scheduled based at least in part on the amount of time between uplink allocations that is needed for performing the frequency retuning.

25. The method of claim 21, wherein a transient period associated with performing the frequency retuning is at a boundary of a demodulation reference signal (DMRS) symbol or at a boundary of the first uplink transmission or the second uplink transmission.

26. A method of wireless communication performed by an apparatus, comprising:
determining an amount of time, between uplink allocations that is needed by a user equipment (UE) for performing a frequency retuning associated with hopping from a first set of frequency resources to a second set of frequency resources during operation of the UE at a subcarrier spacing (SCS), based at least in part on a mapping of the SCS to the amount of time between uplink allocations that is needed for performing the frequency retuning,
wherein the first set of frequency resources is associated with transmitting a first uplink transmission, and the second set of frequency resources is associated with transmitting-a second uplink transmission, and
wherein the mapping of the SCS to the amount of time between the uplink allocations that is needed for performing the frequency retuning is one of mappings, of SCSs to amounts of time needed for performing the frequency returning, stored by the UE; and
receiving information indicating a suggested quantity of symbols associated with performing the frequency retuning;
transmitting, based at least in part on transmitting the suggested quantity of symbols, downlink control information (DCI) indicating a symbol at which to perform the frequency retuning; and receiving the first uplink transmission in the first set of frequency resources and the second uplink transmission in the second set of frequency resources,
    wherein the first uplink transmission and the second uplink transmission are received based at least in part on the amount of time between uplink allocations that is needed by the UE for performing the frequency retuning,
    wherein the second uplink transmission is received at the symbol.

27. The method of claim 26, wherein the amount of time between uplink allocations that is needed for performing the frequency retuning is a quantity of time units.

28. The method of claim 26, wherein the apparatus does not transmit an indication to perform the frequency retuning outside of sets of unallocated resources.

29. The method of claim 26, wherein the first uplink transmission and the second uplink transmission are scheduled based at least in part on the amount of time between uplink allocations that is needed for performing the frequency retuning.

30. The method of claim 26, wherein a transient period associated with performing the frequency retuning is at a boundary of a demodulation reference signal (DMRS) symbol or at a boundary of the first uplink transmission or the second uplink transmission.

* * * * *